United States Patent [19]

Kozawa et al.

[11] 4,252,666
[45] Feb. 24, 1981

[54] SILVER CATALYZED MANGANESE DIOXIDE HYDROGEN GAS ABSORBER

[75] Inventors: Akiya Kozawa, Middleburg Hts.; Karl V. Kordesch, Lakewood, both of Ohio

[73] Assignee: Union Carbide Corporation, New York, N.Y.

[21] Appl. No.: 46,383

[22] Filed: Jun. 7, 1979

Related U.S. Application Data

[63] Continuation of Ser. No. 618,022, Sep. 30, 1975.

[51] Int. Cl.³ ............................ C01B 1/32; H01M 4/86
[52] U.S. Cl. .................................. 252/182.1; 423/248; 423/599; 429/40; 429/50; 429/57
[58] Field of Search ................ 252/182.1; 429/40, 57, 429/50; 423/248, 23, 599

[56] References Cited

U.S. PATENT DOCUMENTS

| | | | |
|---|---|---|---|
| 2,422,045 | 6/1947 | Ruben | 429/57 |
| 2,462,998 | 3/1949 | Ruben | 429/145 |
| 3,117,033 | 1/1964 | Bachmann | 429/60 |
| 3,424,617 | 1/1969 | Grieger et al. | 429/58 |
| 3,700,605 | 10/1972 | Dodman et al. | 252/471 |
| 3,893,870 | 7/1975 | Kozawa | 429/57 |
| 3,925,100 | 12/1975 | Buzzelli | 429/29 |

*Primary Examiner*—Benjamin R. Padgett
*Assistant Examiner*—Irwin Gluck
*Attorney, Agent, or Firm*—Cornelius F. O'Brien

[57] ABSTRACT

The disclosure of this application is directed to silver catalyzed manganese dioxide which is useful as a hydrogen gas absorber. The silver catalyzed manganese dioxide of this invention can be formed into a shaped article of desired configuration, inserted into an electrochemical cell such as a battery, which is subsequently sealed, to absorb hydrogen gas evolved within the cell. Absorption of hydrogen gas by the silver catalyzed manganese dioxide prevents excessive build-up of gas pressure within the sealed cell thus minimizing the possibility of rupture and complete failure of the cell.

11 Claims, No Drawings

SILVER CATALYZED MANGANESE DIOXIDE HYDROGEN GAS ABSORBER

This application is a continuation of our prior U.S. application Ser. No. 618,022, filing date Sept. 30, 1975.

This invention relates to silver catalyzed manganese dioxide which is useful as a hydrogen gas absorber. The silver catalyzed manganese dioxide of this invention can be formed into a shaped article of desired configuration, inserted into an electrochemical cell such as a battery, which is subsequently sealed, to absorb hydrogen gas evolved within the cell. Absorption of hydrogen gas by the silver catalyzed manganese dioxide of this invention prevents excessive build-up of gas pressure within the sealed cell, thus minimizing the possibility of rupture and complete failure of the cell.

In the past, alkaline silver oxide-zinc cells were assembled with the addition of small amounts of manganese dioxide, generally on the order of about 5 to 10 percent by weight based on the total weight of the mixture, to the silver oxide cathode for the purpose of extending the discharge capacity of the cell at reduced cost. It was observed that such silver oxide cells had some hydrogen absorption properties which were ascribed to the silver oxide, since it was well known in the art that manganese dioxide was not capable of reacting with hydrogen at room temperature. Thus, it was believed that silver oxide with a small amount of manganese dioxide as a hydrogen absorber would be undesirably expensive and would not absorb hydrogen in sufficient amounts at a sufficiently rapid rate.

The present invention provides a hydrogen gas absorber which is not only relatively inexpensive but, in addition, absorbs hydrogen gas at a relatively fast rate and has a relatively high total capacity for absorbing hydrogen gas.

The hydrogen gas absorber of the present invention is a silver catalyzed manganese dioxide wherein the silver is present in catalytic amounts, that is, in amounts sufficient to catalyze the reaction between the manganese dioxide and the hydrogen gas. As a rule, the silver content is about 0.5 to about 30 percent by weight, preferably about 1 to 10 percent by weight.

The hydrogen gas absorbers can be prepared by any one of a number of convenient methods. As an illustration, metallic silver or a silver compound, in amounts sufficient to provide amounts of silver previously described, can be admixed with manganese dioxide at room temperature to form a homogeneous mixture.

Alternatively, a silver compound such as a silver salt or a silver oxide can be admixed with manganese dioxide at room temperature to form a homogeneous mixture and the mixture heated at elevated temperatures, generally on the order of about 70° C. to about 250° C., preferably about 75° C. to about 120° C. for a period of time ranging from about 1 to about 24 hours.

In those instances, wherein the preparation of the silver catalyzed manganese dioxide is carried out without a subsequent heating step, the silver content is calculated quantitatively based upon the total weight of manganese dioxide and silver or silver compound. When a subsequent heating step is used, the silver content in the mixture is determined by calculating the weight of silver in the initial mixture of silver and/or silver compound and manganese dioxide, weighing the mixture after the heating step and then dividing the calculated weight of the silver in the initial mixture by the weight of the heated product.

Among suitable silver compunds that can be used to prepare the hydrogen gas absorbers of this invention are the following: a silver oxide, silver acetate, silver carbonate, silver chromate, silver dichromate, silver nitrate, silver nitrite, silver permanganate, silver metaphosphate, silver orthophosphate, silver pyrophosphate, silver sulfate, silver perchlorate, silver chloride, and the like. It is to be understood that mixtures of silver containing materials can be used if so desired.

In order to facilitate mixing of the manganese dioxide with silver or silver compound, it is customary to wet the mixture with water, compatible aqueous solutions or compatible organic liquids. If desired, the source of water can be provided by the use of an aqueous solution of the silver compound.

The manganese dioxide which is used to prepare the hydrogen gas absorber is generally in the form of a powder of a particle size of about 1 to about 60 mircons, preferably about 1 to about 15 microns. Also, the metallic silver and silver compounds, which are admixed with the manganese dioxide, are generally in the form of a powder of a particle size of about 0.1 to about 50 microns, preferably about 0.5 to about 2 microns.

As previously stated, the silver catalyzed manganese dioxide of this invention can be formed into shaped articles of desired configuration and used, for example, in electrochemical cells, such as batteries, to absorb hydrogen gas. The exact configuration of the shaped articles will, of course, vary and depend upon their end use. As illustrations of the ultimate configurations of the hydrogen gas absorbers are plates, rods, pellets, cylinders, rings and the like. These shaped articles can then be used in electrochemical cells to absorb hydrogen gas as described in U.S. application Ser. No. 268,785 filed July 3, 1972, in the name of Akiya Kozawa, now U.S. Pat. No. 3,893,870, the disclosure of which is incorporated herein by reference.

In forming the silver catalyzed manganese dioxide into a shaped article, by methods well known in the art, it is customary to use a binder which will maintain the silver catalyzed manganese dioxide mixture in the desired configuration, be of sufficient porosity to allow hydrogen gas to penetrate therein and be inert to the environment in which the shaped article is to be used. The binder can be any organic or inorganic material having the properties described. Among such binders can be noted polyethylene, epoxy resins and the like.

If desired, additives such as acetylene black, graphite, and the like can be used in forming the shaped articles of the present invention. Such additives improve the conductivity of the shaped articles and provide the shaped articles with permeable channels which allow the hydrogen gas to penetrate the interior thereof.

Also, other properties of the shaped articles, such as physical strength, specific gravity and the like can be improved and/or modified by the use of various additives. For instance, the use of steel wool fibers or other compatible fibers increases the physical strength of the shaped articles. Also, by selection of the type of carbon, the electrical conductivity of the shaped articles can be improved and their specific gravity modified to allow the shaped articles to float in the electrolytes of the electrochemical cells in which they are placed. By floating in the electrolytes, the shaped articles will automatically position themselves at the junction between the electrolyte and air space in the cell where hydrogen gas tends to accumulate.

When the hydrogen gas absorbers of this invention are to be used in electrochemical cells, it is desirable to cover them with a thin plastic film which is permeable to hydrogen gas but impermeable to liquids normally found in electrochemical cells. Covering the shaped articles with a thin, protective film insures protection against any possible deleterious effects due to the electrolyte and other liquids in the electrochemical cells.

Particularly useful plastics which can be applied as protective films include, among others, polyethylene, polystyrene, polyethylene terephthalate, copolymers of vinyl chloride and vinylidene chloride, and the like. Particularly effective is heat-shrunk polyethylene film having a thickness of about 0.5 to about 2.5 mils.

Although the hydrogen gas absorbers of this invention have been described in reference for use in electrochemical cells, they can be used to absorb hydrogen from any area in which hydrogen gas is generated, for example, from between electrical components, from the area of a nuclear reactor, and the like.

The silver catalyzed manganese dioxide hydrogen absorber of this invention can also be regenerated. For example, after it has been saturated with hydrogen, its activity can be substantially restored by exposing the absorber to air at room temperature for 1 to 4 days.

In the following examples, which are illustrative of the present invention and not intended to limit the scope thereof in any manner, the test for hydrogen gas absorption was conducted as follows.

The test sample was placed in a 10 cc beaker and the beaker placed on top of a vertical support column which was centered within a 500 cc beaker. A test tube 3.5 cm in diameter and 30 cm in length was inverted and placed over the 10 cc beaker and vertical support column. Two fine bore plastic tubes, one connected to a hydrogen gas supply source, the other to a nitrogen gas supply source, were inserted up into the inverted test tube to a height just below the top of the 10 cc beaker. The 500 cc beaker was then filled, almost to its top, with vacuum pump oil. The inverted test tube was raised bringing its opening to the level of the oil in the 500 cc beaker. Nitrogen gas was then passed into the inverted test tube at a relatively fast rate for two minutes. After the two-minute nitrogen purge, the inverted test tube was lowered into the oil.

The plastic tube which was connected to the nitrogen gas supply source was disconnected therefrom and connected to a vacuum source. A vacuum was then drawn which resulted in raising the vacuum pump oil within the test tube to a level corresponding to the level of the base of the 10 cc beaker. Thereafter, the plastic tube which had been used to draw the vacuum was removed from within the inverted test tube. Hydrogen gas was then passed through the other plastic tube into the inverted test tube to effect a lowering of the level of the vacuum pump oil within the inverted test tube to the level of the oil in the 500 cc beaker. At this point, the flow of hydrogen gas to the test tube was stopped. As hydrogen gas was absorbed by the test sample, the level of the vacuum pump oil within the inverted test tube rose.

Hydrogen gas absorption was determined by the change in the level of the oil within the inverted test tube. A calibration curve was used to convert the change in the level of the oil to cubic centimeters of hydrogen gas absorbed. The hydrogen gas absorption test was conducted at a temperature of 23° C.±1° C.

Also, in the examples, the manganese dioxide used was a so-called battery grade manganese dioxide having the following properties:

| | |
|---|---|
| Surface area | about 40–60 m$^2$/g |
| Particle size | about 1 to 60 microns |
| Pore diameter | about 40–80 angstroms |
| Pore volume | about 10 percent |
| True density | about 4.5 g/cc (determined with a Beckman Instrument Densitometer using helium gas |

The data of Table I show the amount of hydrogen gas absorbed by the hydrogen gas absorbers of this invention as compared to the amount of hydrogen gas absorbed by hydrogen gas absorbers of the prior art. The data also show that hydrogen is absorbed even in the presence of small amounts of moisture, provided that the pore structure of the hydrogen absorber is not completely filled with liquid.

TABLE I

| | Composition | Silver Content % by Weight | Amount of Hydrogen Gas Absorbed by One Gram Samples in Four Hours | | |
|---|---|---|---|---|---|
| | | | Dry Mix | Dry Mix Moistened with 0.2 cc water | Moistened Mix Heated at 75° C. for 1 hour |
| Example 1 | 97 grams MnO$_2$ + 3 grams Ag$_2$O | 2.8 | 12.5 cc | 22.0 cc | 39.0 cc |
| Example 2 | 99 grams MnO$_2$ + 1 gram Ag$_2$O | 1 | 7.5 cc | 10.5 cc | 13.0 cc |
| Example 3 | 97 grams MnO$_2$ + 3 grams AgO | 2.6 | 13.5 cc | 27.0 cc | 43.5 cc |
| Control 1 | 5 grams MnO$_2$ + 95 grams Ag$_2$O | 88.4 | 4.0 cc | 5.0 cc | 4.0 cc |
| Control 2 | 5 grams MnO$_2$ + 95 grams Ag$_2$O | 88.4 | — | 1.5 cc$^a$ | 2.0 cc$^b$ |
| Control 3 | 5 grams MnO$_2$ + 90 grams Ag$_2$O + 5 grams graphite | 88.2 | 3.0 cc | 4.0 cc | 3.0 cc |
| Control 4 | 5 grams MnO$_2$ + 90 grams Ag$_2$O + 5 grams graphite | 88.2 | — | 1.5 cc$^a$ | 1.5 cc$^a$ |

$^a$the mixture was moistened with 0.2 cc of 6 M KOH instead of water
$^b$the mixture was moistened with 0.2 cc of 6 M KOH instead of water and heated at 75° C. for 2 hours The data of Table II show the hydrogen gas absorption capabilities of silver catalyzed manganese dioxide mixtures containing varying amounts of silver. The materials of Examples 4–7 were thoroughly admixed and heated at a temperature of 250° C. for 18 hours. The heating step removed volatiles from the mixture. The mixture of each example was then crushed to a fine powder and a 0.1 gram sample thereof tested for hydrogen gas absorption.

TABLE II

| Composition | | Silver Content % by Weight | Hydrogen Gas Absorbed After 24 Hours |
|---|---|---|---|
| Example 4 | 2.5 ml of 2 M AgNO$_3$ + 50 grams MnO$_2$ + 17.5 ml H$_2$O | 1.02 | 2 cc |
| Example 5 | 5.0 ml of 2 M AgNO$_3$ + 50 grams MnO$_2$ + 15 ml H$_2$O | 2.05 | 3 cc |
| Example 6 | 10.0 ml of 2 M AgNO$_3$ + 50 grams MnO$_2$ + 10 ml H$_2$O | 4.1 | 5 cc |
| Example 7 | 20.0 ml of 2 M AgNO$_3$ + 50 grams MnO$_2$ | 8.2 | 6 cc |

The following abbreviations used herein are defined as follows:

- cc: cubic centimeter(s)
- cm: centimeter
- g: gram(s)
- m: meter(s)
- M: molar
- mil: one thousandth inch
- ml: milliliter(s)

We claim:

1. A method for absorbing hydrogen gas comprising providing a hydrogen gas absorber wherein the active hydrogen gas absorber component consists of silver catalyzed manganese dioxide.

2. The method of claim 1 wherein the silver content of the active hydrogen gas absorber component is about 0.5 to about 30 percent by weight.

3. The method of claim 2 wherein the silver content of the active hydrogen gas absorber component is about 1 to about 10 percent by weight.

4. The method of claim 2 wherein said hydrogen gas absorber comprises a shaped article of silver catalyzed manganese dioxide.

5. A method for absorbing hydrogen gas comprising providing a hydrogen gas absorber wherein the active hydrogen gas absorber component consists of a mixture of silver or silver compound and manganese dioxide wherein the silver content of said mixture is about 0.5 to about 30 percent by weight.

6. The method of claim 5 wherein the silver content of the active hydrogen gas absorber component is about 1 to about 10 percent by weight.

7. The method of claim 5 wherein the silver compound is a silver oxide.

8. The method of claim 7 wherein the silver oxide is AgO.

9. The method of claim 7 wherein the silver oxide is Ag$_2$O.

10. The method of claim 5 wherein the silver compound is a silver salt.

11. The method of claim 10 wherein the silver salt is silver nitrate.

* * * * *